(12) United States Patent
Murali et al.

(10) Patent No.: US 10,250,953 B1
(45) Date of Patent: Apr. 2, 2019

(54) DISPLAYING LINKED HYPER-VIDEOS WITHIN HYPER-VIDEOS

(71) Applicant: INTERNATIONAL BUSINESS MACHINES CORPORATION, Armonk, NY (US)

(72) Inventors: Srikanth K. Murali, Bangalore (IN); Bidhu Ranjan Sahoo, Bangalore (IN); Aparna Seshadri, Bengaluru (IN); Padmanabha Venkatagiri Seshadri, Mysore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/822,308

(22) Filed: Nov. 27, 2017

(51) Int. Cl.
| | |
|---|---|
| H04N 21/858 | (2011.01) |
| H04N 21/8543 | (2011.01) |
| G06K 9/00 | (2006.01) |
| G11B 27/036 | (2006.01) |
| H04N 5/45 | (2011.01) |
| H04N 21/84 | (2011.01) |

(52) U.S. Cl.
CPC ..... *H04N 21/8586* (2013.01); *G06K 9/00744* (2013.01); *G11B 27/036* (2013.01); *H04N 5/45* (2013.01); *H04N 21/84* (2013.01); *H04N 21/8543* (2013.01)

(58) Field of Classification Search
CPC ...... H04N 21/8586; H04N 5/45; H04N 21/84; H04N 21/8543; G06K 9/00744; G11B 27/036

See application file for complete search history.

(56) References Cited

U.S. PATENT DOCUMENTS 6,006,265 A * 12/1999 Rangan ............. G06F 17/30855
348/E5.104
6,154,771 A 11/2000 Rangan et al.
6,965,890 B1 11/2005 Dey et al.
(Continued)

OTHER PUBLICATIONS

Agarwal et al., "Building Rome in a Day," Communications of the ACM, Oct. 2011, vol. 54, No. 10, Copyright 2011 ACM, pp. 105-112.
(Continued)

*Primary Examiner* — Mishawn N Hunter
(74) *Attorney, Agent, or Firm* — Jordan T. Schiller (57) ABSTRACT

A method for placing a linked hyper-video within a hyper-video. The method includes identifying one or more points of interest in the hyper-video, detecting one or more features of the hyper-video, extracting at least one of the one or more features, and displaying the linked hyper-video, within the hyper-video, based on the one or more identified points of interest and based on the extracted at least one of the one or more features. The method further includes extracting one or more features from the hyper-video that depict one or more viewing characteristics of a user. The method includes analyzing the one or more features from the hyper-video to identify a low-saliency area of the hyper-video, a low-frequency region within the low-saliency area, and a homogenous sub-region within the low-frequency region. The method further includes placing a linked hyper-video at the homogenous sub-region within the low-frequency region of the hyper video.

14 Claims, 5 Drawing Sheets

(56) References Cited

U.S. PATENT DOCUMENTS

| | | | |
|---|---|---|---|
| 7,765,462 | B2 | 7/2010 | Dey et al. |
| 7,802,177 | B2 | 9/2010 | Dey et al. |
| 8,271,487 | B1 | 9/2012 | Hermush et al. |
| 8,531,449 | B2 | 9/2013 | Lynch et al. |
| 9,244,923 | B2 | 1/2016 | Cooper et al. |
| 9,361,943 | B2 | 6/2016 | Thrun |
| 9,369,679 | B2 | 6/2016 | Arrvidsson et al. |
| 2007/0070069 | A1 | 3/2007 | Samarasekera et al. |
| 2010/0064220 | A1 | 3/2010 | Sankaranarayan |
| 2011/0200303 | A1 | 8/2011 | Pujol Alcolado et al. |
| 2012/0169842 | A1* | 7/2012 | Chuang ............ G08B 13/19619 348/39 |
| 2013/0251340 | A1* | 9/2013 | Jiang ................. G06K 9/00718 386/244 |
| 2014/0324249 | A1* | 10/2014 | Lacaze ................ G05D 1/0038 701/2 |
| 2016/0179293 | A1 | 6/2016 | Girgensohn et al. |
| 2018/0115706 | A1* | 4/2018 | Kang ................. H04N 5/23238 |

OTHER PUBLICATIONS

Kuster et al., "FreeCam: A Hybrid Camera System for Interactive Free-Viewpoint Video," Vision, Modeling, and Visualization 2011 (Best Date Available), Copyright the Eurographics Association 2011, Content uploaded on Jul. 3, 2017, https://www.researchgate.net/publication/22083911, pp. 1-9.

Wang et al., "Multiview Video Sequence Analysis, Compression, and Virtual Viewpoint Synthesis," IEEE Transactions on Circuits and Systems for Video Technology, Vol. 10, No. 3, Apr. 2000, pp. 397-410.

Mell et al., "The NIST Definition of Cloud Computing," Recommendations of the National Institute of Standards and Technology, U.S. Department of Commerce, Special Publication 800-145, pp. 1-7.

* cited by examiner

DISPLAYING LINKED HYPER-VIDEOS WITHIN HYPER-VIDEOS

BACKGROUND

Embodiments of the present invention relate generally to the field of computing and more particularly to data processing and displaying linked hyper-videos within existing hyper-videos.

Hyper-videos, such as 360-degree videos, are being increasingly adopted in many domains such as social media live-streaming, exploration videos for science education, and so forth. Placing a linked hyper-video (e.g. a thumbnail) contextually within an existing hyper-video may help a user navigate to higher detail by clicking on these linked hyper-videos.

Currently, there is no mechanism to automatically place a linked hyper-video within an existing hyper-video such that it captures the user's attention and yet does not obstruct the user's viewing experience

SUMMARY

Embodiments of the invention include a method, computer program product, and system, for placing a linked hyper-video within a hyper-video.

According to an embodiment, a method for placing a linked hyper-video within a hyper-video, wherein the method includes identifying one or more points of interest in the hyper-video, detecting one or more features of the hyper-video, extracting at least one of the one or more features, and displaying the linked hyper-video, within the hyper-video, based on the one or more identified points of interest and based on the extracted at least one of the one or more features.

A computer program product, according to an embodiment of the invention, includes a non-transitory tangible storage device having program code embodied therewith. The program code is executable by a processor of a computer to perform a method. The method includes identifying one or more points of interest in the hyper-video, detecting one or more features of the hyper-video, extracting at least one of the one or more features, and displaying the linked hyper-video, within the hyper-video, based on the one or more identified points of interest and based on the extracted at least one of the one or more features.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method includes identifying one or more points of interest in the hyper-video, detecting one or more features of the hyper-video, extracting at least one of the one or more features, and displaying the linked hyper-video, within the hyper-video, based on the one or more identified points of interest and based on the extracted at least one of the one or more features.

DETAILED DESCRIPTION

A hyper-video, or hyperlinked video, is a displayed video stream that contains embedded, user-clickable anchors, allowing navigation between video and other hypermedia elements. Hyper-video also allows for 360-degree navigation and exploration along multiple trajectory paths, which is not available in normal videos.

Hyper-video is thus analogous to hypertext, which allows a reader to click on a word in one document and retrieve information from another document, or from another place in the same document. Similarly, hyper-video combines video with a non-linear information structure, allowing a user to make choices based on the content of the video and the user's interests.

A crucial difference between hyper-video and hypertext is the element of time. Text is normally static, while a video is necessarily dynamic, meaning the content of the video changes with time. Consequently, hyper-video has different technical and aesthetic requirements than a static hypertext page. For example, hyper-video might involve the creation of a link from an object in a video that is visible for only a certain duration. It is therefore necessary to segment the video appropriately and add the metadata required to link from frames, or even objects, in a video to the pertinent information in other media forms.

The present invention discloses a mechanism to place a linked hyper-video within an existing hyper-video, which would enable content providers with the ability to enrich a hyper-video experience by placing hyper-video links, or thumbnails, within an existing hyper-video to provide more information about a hotspot located in a scene within the hyper-video. An example of a hotspot located in a scene may be a tourist attraction or a popularly visited location such as Central Park or the Statue of Liberty located in New York City. An imbedded thumbnail hyper-video link relating to the hotspot may serve to provide a deeper knowledge about the hotspot, such as a hyper-video link showing the inside structures of the Statue of Liberty or a video narrative depicting the delivery of the Statue of Liberty and the building of its foundation and visitor center.

The present invention, additionally, determines the optimal location, within an existing hyper-video, to place a linked hyper-video thumbnail such that it captures a user's attention without obstructing the user's viewing experience. As a result, content providers may dynamically, and automatically, push advertisements and more informative linked hyper-videos, as the user is viewing the existing hyper-video, without interrupting the user's viewing experience (e.g. by blocking the hotspot with a linked hyper-video thumbnail).

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Figure 1:
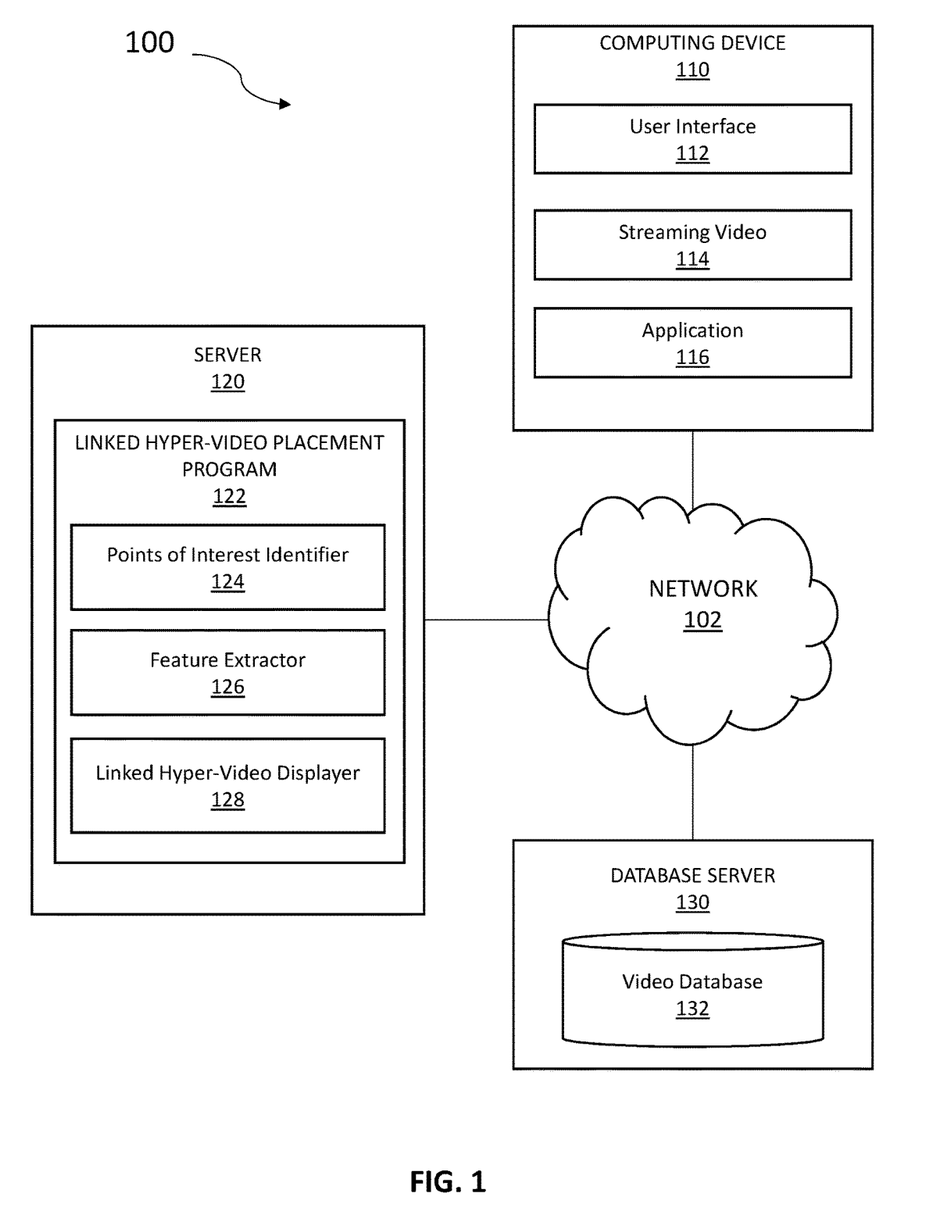
FIG. 1 illustrates linked hyper-video computing environment 100, in accordance with an embodiment of the present invention.

FIG. 1 illustrates a linked hyper-video computing environment 100, in accordance with an embodiment of the present invention. Computing environment 100 includes computing device 110, server 120, and database server 130 all connected via network 102. The setup in FIG. 1 represents an example embodiment configuration for the present invention, and is not limited to the depicted setup in order to derive benefit from the present invention.

In the example embodiment, computing device 110 contains user interface 112, application 114, and streaming video 116. In various embodiments, computing device 110 may be a laptop computer, tablet computer, netbook computer, personal computer (PC), a desktop computer, a personal digital assistant (PDA), a smart phone, or any programmable electronic device capable of communicating with server 120 and database server 130 via network 102. Computing device 110 may include internal and external hardware components, as depicted and described in further detail below with reference to FIG. 3. In other embodiments, computing device 110 may be implemented in a cloud computing environment, as described in relation to FIGS. 4 and 5, herein. Computing device 110 may also have wireless connectivity capabilities allowing it to communicate with server 120 and database server 130, as well as other computers or servers over network 102.

In an example embodiment, user interface 112 may be a computer program that allows a user to interact with computing device 110 and other connected devices via network 102. For example, user interface 112 may be a graphical user interface (GUI). In addition to comprising a computer program, user interface 112 may be connectively coupled to hardware components, such as those depicted in FIG. 3, for receiving user input. In an example embodiment, user interface 112 is a web browser, however in other embodiments user interface 112 may be a different program capable of receiving user interaction and communicating with other devices.

In the example embodiment, streaming video 114 may be a live video feed from an individual user that is capable of being displayed on computing device 110. Streaming video 114, for example may be streamed via a social media platform depicting a user's location and camera viewpoint orientation. A camera viewpoint orientation may be a user's point of view relative to a hotspot. For example, if a user is live streaming a streaming video 114 on a social media platform while on vacation in Rome, a hotspot may be the Coliseum. In this instance, if a user captures the Coliseum in their live streaming video 114, the present invention may be capable of placing a hyper-linked thumbnail video next to the Coliseum (without obstructing the user's view of the Coliseum) that, when clicked, provides the user with another video about the Coliseum, perhaps a re-enactment of the types of battles that ensued within the Coliseum during the Middle Ages and so forth. In various embodiments, streaming video 114 may be saved to a database once the live streaming is terminated.

In an example embodiment, application 116 may be a computer program, on computing device 110, that is capable of receiving videos from video database 132, as well as saved or live streaming videos 114. In various embodiments, videos may include movies, raw footage, filmed excursions by individuals, groups of individuals, from various locations. In one embodiment, application 116 may be a website that contains access to a video or photograph repository, such as well-known websites that act as a platform for posting videos or photographs. In an exemplary embodiment, various posted videos, or photographs, may contain video footage at a same hotspot location but from various camera viewpoint orientations due to different users filming, or photographing, the hotspot from different angles, positions, directions or point of view.

With continued reference to FIG. 1, server 120 contains linked hyper-video placement program 122 and may be a laptop computer, tablet computer, netbook computer, personal computer (PC), a desktop computer, a personal digital assistant (PDA), a smart phone, or any programmable electronic device capable of communicating with computing device 110 and database server 130 via network 102. While server 120 is shown as a single device, in other embodiments, server 120 may be comprised of a cluster or plurality of computing devices, working together or working separately. Server 120 may be implemented in a cloud computing environment, as described in relation to FIGS. 4 and 5, herein.

In the exemplary embodiment, linked hyper-video placement program 122 contains instruction sets, executable by a processor, which may be described using a set of functional modules. The functional modules of linked hyper video program 122 may include points of interest identifier 124, feature extractor 126, user perspective creator 128, and linked hyper-video displayer 129.

In the example embodiment, database server 130 includes video database 132 and may be a laptop computer, tablet computer, netbook computer, personal computer (PC), a desktop computer, a personal digital assistant (PDA), a smart phone, a server, or any programmable electronic device capable of communicating with computing device 110 and server 120 via network 102. While database server 130 is shown as a single device, in other embodiments, database server 130 may be comprised of a cluster or plurality of computing devices, working together or working separately.

In the example embodiment, video database 132 contains videos such as home movies, raw footage, excerpts from educational movies and so forth. In exemplary embodiments, video database 132 may also store terminated streaming videos 114. In an exemplary embodiment, video database 132 may be organized according to a location of the video (e.g. Washington D.C., New York City, San Francisco), a popular hotspot category (e.g. Lincoln Memorial, Statue of Liberty, Golden Gate Bridge), or any other category or organization deemed most useful for the invention to be utilized. In various embodiments, video database 132 may contain a collection of photographs depicting various locations and hotspots taken by individuals from around the world.

In various embodiments, video database 132 may be capable of being stored on server 120 or computing device 110, as a separate database.

Figure 2:
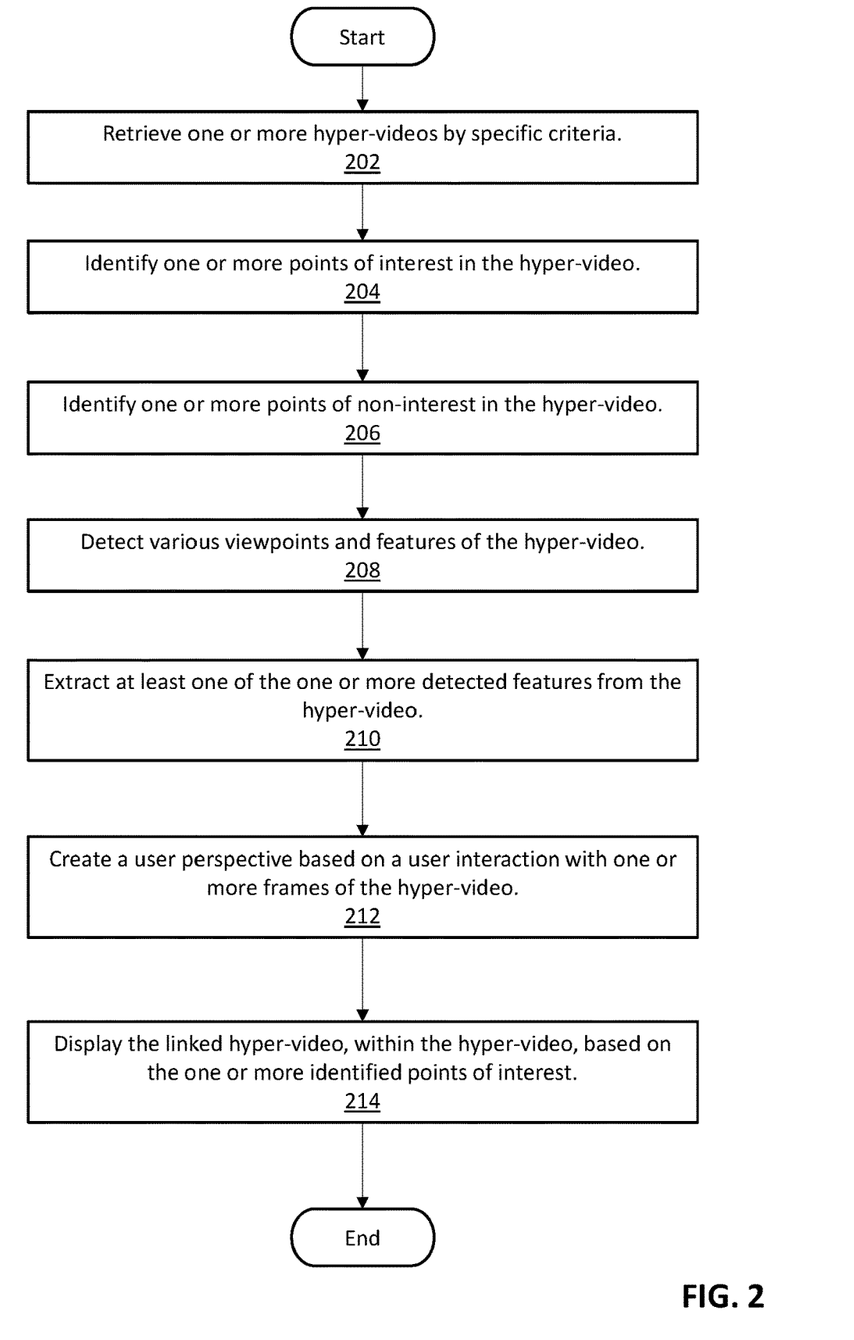
FIG. 2 is a flowchart illustrating the operation of linked hyper-video placement program 122, in accordance with an embodiment of the present invention.

FIG. 2 is a flowchart illustrating the operation of linked hyper-video placement program 122, in accordance with an embodiment of the present invention.

Referring now to FIGS. 1 and 2, linked hyper-video placement program 122 may retrieve one or more videos by specific criteria (step 202). In exemplary embodiments, specific criteria may include the inclusion of one or more particular hotspots at a particular location, within a hyper-video (e.g. the Washington Monument, the Coliseum, the Statue of Liberty). In an exemplary embodiment, linked hyper-video placement program 122 may retrieve one or more hyper-videos containing the specific criteria by crawling the content of hyper-videos and photographs on a database (e.g. video database 132), or application, (e.g. application 116) to identify hotspots. For example, hotspots may be identified via optical character recognition (OCR) analysis, popularity of a hotspot (i.e. structure, monument, tourist attraction) taken from posted videos or photographs on a social media platform (e.g. number of views it has received, number of comments received, number of "likes" received), metadata containing location tags, keywords and so forth. Additionally, the popularity of a hotspot may be determined based on tourism registry statistics, or by any other means known to one or ordinary skill in the art.

With continued reference to FIGS. 1 and 2, points of interest identifier 124 includes a set of programming instructions in linked hyper-video placement program 122. The set of programming instructions is executable by a processor. Points of interest identifier 124 identifies one or more points of interest in the hyper-video (step 204). In an exemplary embodiment, a point of interest may include a monument, a structure, a tourist attraction that may be suitable for a user to learn more about. In exemplary embodiments, a point of interest may be referred to as a hotspot. Hotspots may be quantified by specific metadata from the hyper-video, such as the number of views, the number of tags, the number of other videos found within the database containing the same point of interest, and so forth.

Points of interest identifier 124 further identifies one or more points of non-interest in the hyper-video (step 206). In an exemplary embodiment, points of non-interest may include locations within the hyper-video that are not one or more points of interest, for example open sky, grass, random faces and objects surrounding a tourist attraction, monument, or structure. In other words, one or more points of non-interest in the hyper-video may be viewable items of inconsequential value to the viewing priorities of a user.

In exemplary embodiments, points of interest identifier 124 may be capable of detecting one or more features of the hyper-video, wherein the one or more features comprise at least one camera viewpoint orientation, at least one low-level content feature, and at least one high-level content feature (step 208).

In exemplary embodiments, the one or more features may further comprise at least one audio feature. An audio feature may include a narration of a video, background noise such as people talking, airplanes flying, birds singing, and any other audio that may be heard on the hyper-video.

In an exemplary embodiment, a camera viewpoint orientation may include the point of view of a hotspot from the videographer's perspective (e.g. facing north, south, east, or west). In alternative embodiments, a video may be recorded via a drone camera, or flying video-camera, which may be capable of providing a bird's eye view of a hotspot location. In exemplary embodiments, camera viewpoint orientation techniques, such as structure-from-motion, may be applied to estimate the viewpoint orientation of a given streaming/stored video with respect to other viewing sessions of the same video by other users. By obtaining the various viewpoints of a hotspot, points of interest identifier 124 may be capable of mapping a 360-degree hotspot scene, which may prove useful in determining placement of a linked hyper-video as a user changes her location around a hotspot scene. For example, while a user is viewing the Coliseum from the west, the linked hyper-video may be optimally placed in the right hand corner of the video in order to not obstruct the view of the coliseum. On the other hand, if the user is viewing the Coliseum from the east, the linked hyper-video may be optimally placed in the left hand corner of the video. Optimal placement of the linked hyper-video, within a hyper-video, is the essence of the subject invention and is further explained herein.

Low-level content features may include content feature points such as scale-invariant feature transform (SIFT), oriented fast and rotated brief (ORB), and maximally stable extremal regions (MSER), etc. In exemplary embodiments, these low-level content features may be extracted from a given video.

High-level content features may include faces, objects, text, and so forth that is contained within the frame of the video showing the hotspot that the user is interested in seeing, and perhaps learning more about. In an exemplary embodiment, the faces, objects, and subtitles surrounding the hotspot may be considered extraneous details of no importance, and therefore may be crawled within the content of the video scene and extracted out.

Audio features may include transcripts, music tracks, background noise, human chatter that is contained within the frame of the video showing the hotspot that the user is interested in seeing, and perhaps even hearing. For example, the hotspot may be Big Ben in London. Big Ben may make a nice ringing sound in the video when the clock strikes midnight. If there is background noise of people talking, music playing and so forth, this extraneous content may distract the viewer from hearing Big Ben making the nice ringing sound when the clock strikes midnight. As such, it may be beneficial to extract the distracting background audio content from the video scene.

With continued reference to FIGS. 1 and 2, feature extractor 126 includes a set of programming instructions in linked hyper-video placement program 122. The set of programming instructions is executable by a processor. Feature extractor 126 extracts at least one of the one or more detected features of the hyper-video (step 210). In exemplary embodiments, feature extractor 126 extracts at least one of the one or more detected features that may distract from the one or more points of interest in the hyper-video. As discussed above, features of the scene that may be extracted may include: camera viewpoint orientation; low-level content features; high-level content features; and audio features. In exemplary embodiments, feature extractor 126 may extract at least one camera viewpoint orientation, at least one low-level content feature, at least one high-level content feature, and at least one audio feature. In alternative embodiments, feature extractor 126 may extract one or more of a camera viewpoint orientation, a low-level content feature, a high-level content feature, and an audio feature.

In exemplary embodiments, feature extractor 126 creates a user perspective based on a user interaction with one or more frames of the hyper-video, wherein a user interaction may include a zoom, a pan, or a translation (step 212). These interactions, in exemplary embodiments, may be logged, via feature extractor 126, thus conveying points of interest versus points of non-interest within one or more frames of a hyper-video.

In exemplary embodiments, the extracted features may then be analyzed to create the persona, or perspective, of the user. For example, consider a social media platform live streaming a hyper-video (i.e. 360-degree video) in Washington D.C. on the 4$^{th}$ of July, where there are a lot of tourist hot-spots and celebrations contained within the video. Various users may be watching the video. Some users may start at Capitol Hill, while others may begin at the Lincoln Memorial, and several others may want to start at the Washington Monument. As a user moves through the video, watching the monuments and the ongoing celebrations, additional hyper-video links (i.e. 360-degree video links) may be placed, or displayed, close to the monuments (i.e. hotspot), but not on them, so that a user may jump into these and discover more information about a particular monument, or location near a monument, of interest. For instance, a hyper-video link for the Battle of Gettysburg may be placed near the Lincoln Memorial, and when a viewer enters it (i.e. clicks on the hyper-video link) and moves around, the viewer may now reach Cemetery Hill, where they could find additional hyper-video links of war documentaries related to the Pickett's charge, and other historical events related to the Battle of Gettysburg.

With continued reference to the illustrative example above, a user may be capable of panning a hyper-video. Panning is the sweeping movement of a camera across a scene of a video. The user may identify a hotspot (e.g. Lincoln Memorial, Washington Monument) while panning, and decide to zoom-in to the hotspot in order to see it in greater detail on the hyper-video. Likewise, a user may zoom-out in order to see the hotspot in a greater context (e.g. in relation to surrounding hotspots). The user interactions within a hyper-video help to create the user perspective. Additionally, user interactions within a hyper-video create a more fluid, or dynamic, video environment. For example, a linked hyper-video placed next to a hotspot within the hyper-video, while the user is zoomed-out (i.e. hyper-video link may be placed within the night sky without obstructing the user's view of the hotspot), may have a different placement in the hyper-video frame when a user is zoomed-in (i.e. hyper-video link may be placed in foreground grassy area) to that same hotspot.

In exemplary embodiments, linked hyper-video placement program 122 is capable of determining a proper placement location for a linked hyper-video, within the hyper-video, without obstructing a user's viewpoint of the hotspot. Additionally, linked hyper-video placement program 122 is capable of doing this from various user perspectives, as more fully described herein.

With continued reference to FIGS. 1 and 2, linked hyper-video displayer 128 includes a set of programming instructions in linked hyper-video placement program 122. The set of programming instructions is executable by a processor. Linked hyper-video displayer 128 displays the linked hyper-video, within the hyper-video, based on the one or more identified points of interest and based on the extracted at least one of the one or more features (step 214). In exemplary embodiments, displaying the linked hyper-video within the hyper-video is further based on identifying one or more points of non-interest in the hyper-video. The one or more points of non-interest may include at least one of a low-saliency area of the hyper-video, a low-frequency region within the low-saliency area of the hyper-video, and a homogenous sub-region within the low-frequency region of the hyper-video.

Linked hyper-video displayer 128, in exemplary embodiments, analyzes the extracted features of a hyper-video, and identifies low-saliency areas of the hyper-video, low-frequency regions within the low-saliency areas, and homogenous sub-regions within the low-frequency regions. The saliency, or prominence, of an area refers to an area within the frame of the hyper-video where the image is particularly noticeable or important for a user to see. As such, low-saliency areas of the hyper-video are areas where the image is not particularly noticeable or important for the user to see.

In exemplary embodiments, linked hyper-video displayer 128 may analyze the features mentioned above to determine saliency within a frame of the hyper-video. In exemplary embodiments, non-salient and salient areas of a hyper-video frame are identified and denoted, via linked hyper-video displayer 128. For example, with continued reference to the illustrative example above, in a hyper-video frame showing the Lincoln Memorial, a salient area may be the Lincoln Memorial itself, while non-salient areas may include the night sky, the long reflecting pond, fireworks in the sky, pigeons in the water, tourists walking around the base of the Lincoln Memorial, and so forth.

In exemplary embodiments, linked hyper-video displayer 128 identifies low-frequency regions within the low saliency areas. Within these low saliency areas, highly changing (i.e. high frequency changes) areas and slowly changing (i.e. low frequency changes) areas are denoted, via linked hyper-video displayer 128.

In exemplary embodiments, linked hyper-video displayer 128 may find homogenous sub-regions within the low-frequency regions of the low saliency areas, such that blocking, or covering up, a part of the homogenous sub-region with a linked hyper-video thumbnail, for example, would not affect the hyper-video viewing experience of the user. With continued reference to the illustrative example above, a homogenous sub-region contained within a frame of the hyper-video showing the Lincoln Memorial may include an area with homogenous coloring such as the night sky and the water in the reflecting pond. The night sky next to the Lincoln Memorial may be an ideal place to display a linked hyper-video thumbnail, in order to present the viewer with an option to click on the hyper-video link to learn more about the history, for example, of the Lincoln Memorial.

In exemplary embodiments, linked hyper-video displayer 128 may determine a similarity of a user perspective viewing the one or more points of interest with one or more previous user perspectives viewing the one or more points of interest, compute a weighted error for the displayed linked hyper-video based on the determined similarity, and display the linked hyper-video, within the hyper-video, based on the weighted error. In exemplary embodiments, a similarity of a user perspective may include a common perspective derived from multiple users viewing a point of interest, or hotspot, from a particular camera viewpoint orientation, which may include a zoom-in, zoom-out, pan, or other user interaction with the point of interest in the hyper-video. A user's camera viewpoint may be used to filter out non-interesting regions in the hyper-video frame where the user is not looking. In exemplary embodiments, low-frequency regions with homogenous coloring within the camera viewpoint may be selected to place the linked hyper-video.

With continued reference to FIGS. 1 and 2, linked hyper-video placement program 122 may be capable of computing a weighted error for the displayed linked hyper-video based on the determined similarity of previous hyper-video views/interactions of multiple users. The difference between current linked hyper-video placement estimates and prior linked hyper-video placement estimates are computed for similar hyper-videos (e.g. similar locations with similar hotspots) and used to compute a weighted error, which is then added to the current location estimate of the linked hyper-video. In exemplary embodiments, linked hyper-video displayer 128 may then be capable of displaying the linked hyper-video, within the hyper-video, based on the weighted error.

Figure 3:
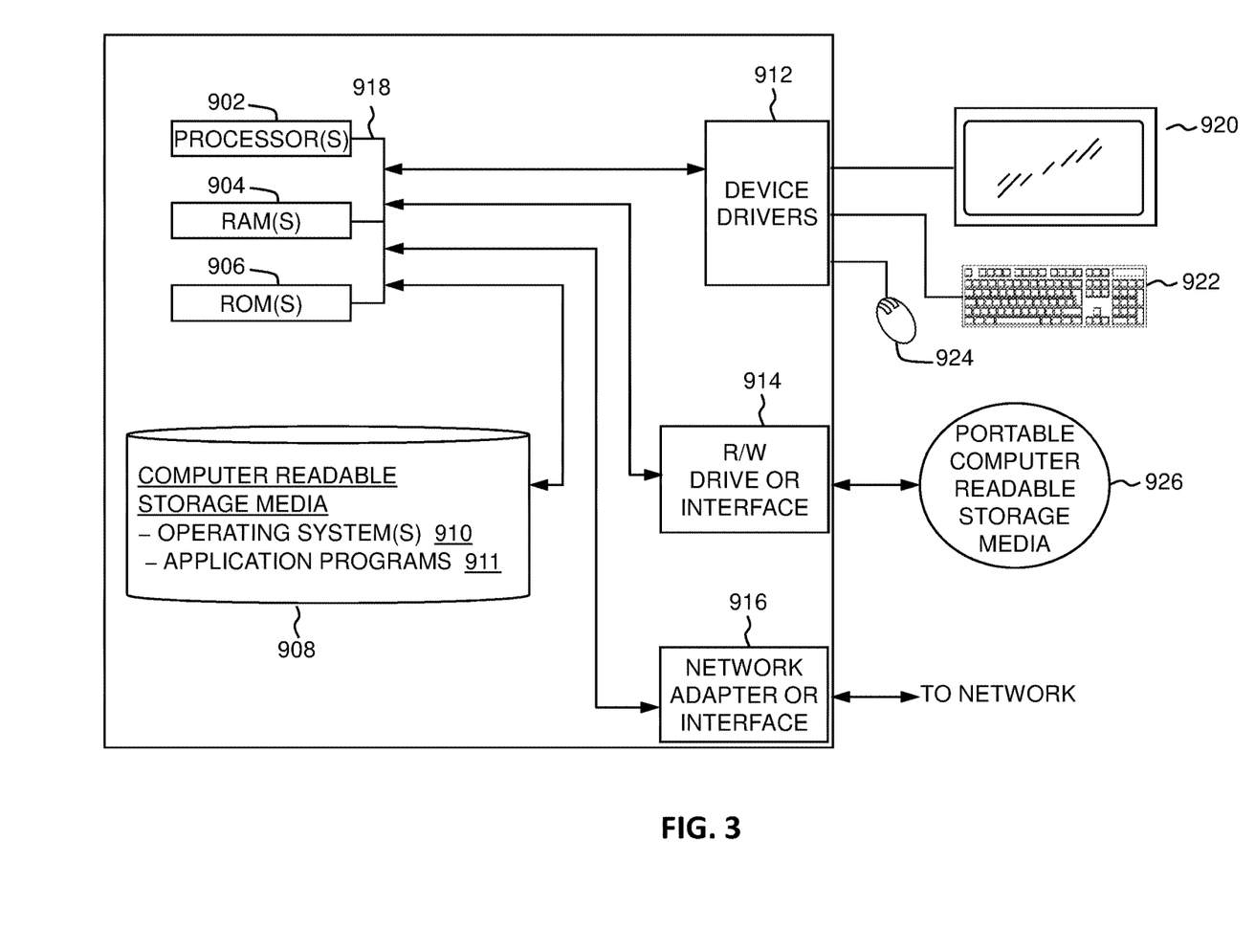
FIG. 3 is a diagram graphically illustrating the hardware components of linked hyper-video computing environment 100 of FIG. 1, in accordance with an embodiment of the present invention.

FIG. 3 is a block diagram depicting components of a computing device in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device of FIG. 3 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as linked hyper-video placement program 122, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device of FIG. 3 may also include a R/W drive or interface 914 to read from and write to one or more portable computer readable storage media 926. Application programs 911 on computing device may be stored on one or more of the portable computer readable storage media 926, read via the respective R/W drive or interface 914 and loaded into the respective computer readable storage media 908.

Computing device of FIG. 3 may also include a network adapter or interface 916, such as a TCP/IP adapter card or wireless communication adapter (such as a 4G wireless communication adapter using OFDMA technology). Application programs 911 on computing device of FIG. 3 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device of FIG. 3 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 4:
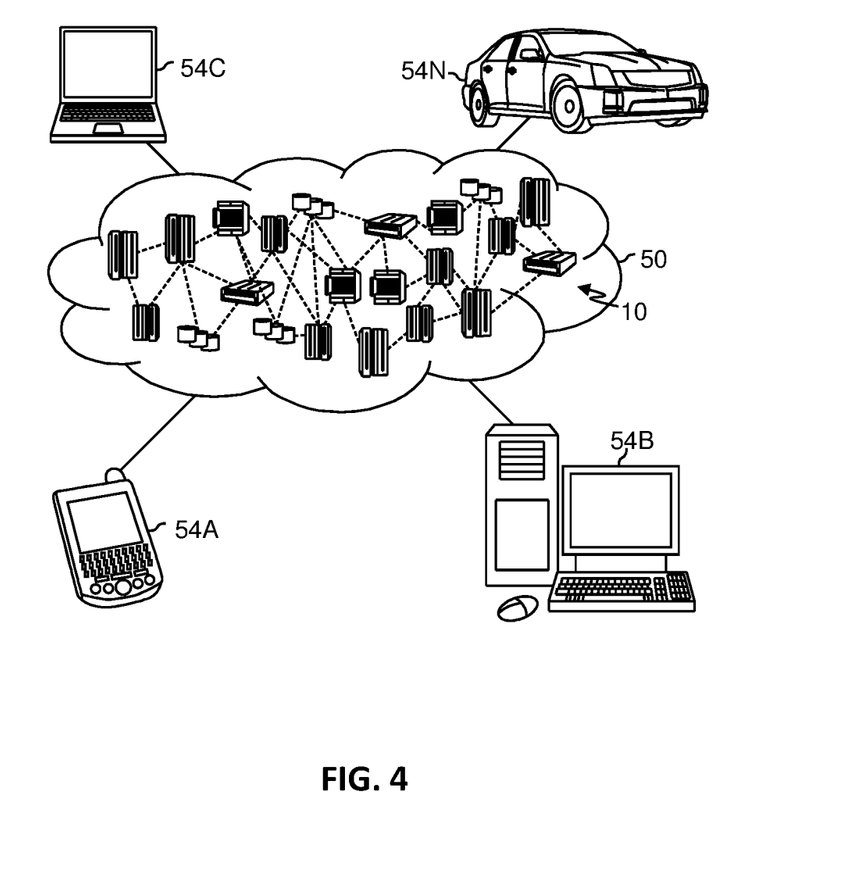
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
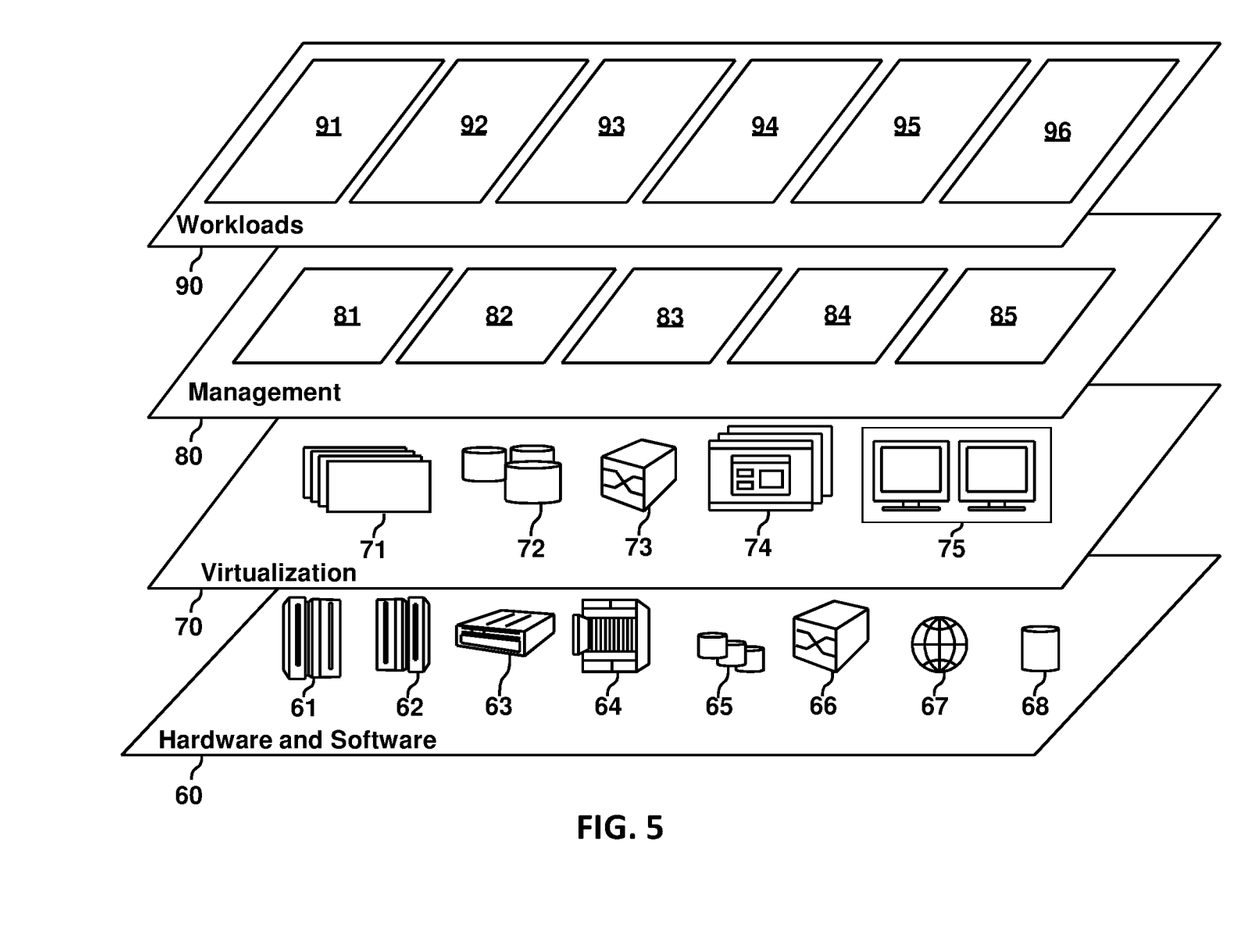
FIG. 5 depicts abstraction model layers of the illustrative cloud computing environment of FIG. 4, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; analytics services 96, including those described in connection with FIGS. 1-5.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for displaying a linked hyper-video within a hyper-video, the method comprising:
   identifying one or more points of interest in the hyper-video;
   detecting one or more features of the hyper-video;
   extracting at least one of the one or more features; and
   displaying the linked hyper-video, within the hyper-video, based on the one or more identified points of interest and based on the extracted at least one of the one or more features,
      wherein displaying the linked hyper video within the hyper video is further based on identifying one or more points of non-interest in the hyper-video; and
   wherein the one or more points of non-interest include at least one of a low-saliency area of the hyper-video, a low-frequency region within the low-saliency area of the hyper-video, and a homogenous sub-region within the low-frequency region of the hyper-video.

2. The computer-implemented method of claim 1, wherein the one or more features comprise at least one camera viewpoint orientation, at least one low-level content feature, and at least one high-level content feature.

3. The computer-implemented method of claim 1, wherein the one or more features further comprise at least one audio feature.

4. The computer-implemented method of claim 1, further comprising:
   creating a user perspective based on a user interaction with one or more frames of the hyper-video, wherein a user interaction may include a zoom, a pan, or a translation.

5. The computer-implemented method of claim 1, further comprising:
   determining a similarity of a user perspective viewing the one or more points of interest with one or more previous user perspectives viewing the one or more points of interest;
   computing a weighted error for the displayed linked hyper-video based on the determined similarity; and
   wherein displaying the linked hyper-video, within the hyper-video, is further based on the weighted error.

6. A computer program product, comprising a non-transitory tangible storage device having program code embodied therewith, the program code executable by a processor of a computer to perform a method, the method comprising:
   identifying one or more points of interest in the hyper-video;
   detecting one or more features of the hyper-video;
   extracting at least one of the one or more features; and
   displaying the linked hyper-video, within the hyper-video, based on the one or more identified points of interest and based on the extracted at least one of the one or more features,
      wherein displaying the linked hyper video within the hyper video is further based on identifying one or more points of non-interest in the hyper-video; and
   wherein the one or more points of non-interest include at least one of a low-saliency area of the hyper-video, a low-frequency region within the low-saliency area of the hyper-video, and a homogenous sub-region within the low-frequency region of the hyper-video.

7. The computer program product of claim 6, wherein the one or more features comprise at least one camera viewpoint orientation, at least one low-level content feature, and at least one high-level content feature.

8. The computer program product of claim 7, wherein the one or more features further comprise at least one audio feature.

9. The computer program product of claim 6, further comprising:
   creating a user perspective based on a user interaction with one or more frames of the hyper-video, wherein a user interaction may include a zoom, a pan, or a translation.

10. The computer program product of claim 6, further comprising:
    determining a similarity of a user perspective viewing the one or more points of interest with one or more previous user perspectives viewing the one or more points of interest;
    computing a weighted error for the displayed linked hyper-video based on the determined similarity; and
    wherein displaying the linked hyper-video, within the hyper-video, is further based on the weighted error.

11. A computer system, comprising:
    one or more computer devices each having one or more processors and one or more tangible storage devices; and
    a program embodied on at least one of the one or more storage devices, the program having a plurality of program instructions for execution by the one or more processors, the program instructions comprising instructions for:
       identifying one or more points of interest in the hyper-video;
       detecting one or more features of the hyper-video;
       extracting at least one of the one or more features; and
       displaying the linked hyper-video, within the hyper-video, based on the one or more identified points of interest and based on the extracted at least one of the one or more features,
          wherein displaying the linked hyper video within the hyper video is further based on identifying one or more points of non-interest in the hyper-video; and
          wherein the one or more points of non-interest include at least one of a low-saliency area of the hyper-video, a low-frequency region within the low-saliency area of the hyper-video, and a homogenous sub-region within the low-frequency region of the hyper-video.

12. The computer system of claim 11, wherein the one or more features comprise at least one camera viewpoint orientation, at least one low-level content feature, and at least one high-level content feature.

13. The computer system of claim 11, further comprising:
    creating a user perspective based on a user interaction with one or more frames of the hyper-video, wherein a user interaction may include a zoom, a pan, or a translation.

14. The computer system of claim 11, further comprising:
    determining a similarity of a user perspective viewing the one or more points of interest with one or more previous user perspectives viewing the one or more points of interest;
    computing a weighted error for the displayed linked hyper-video based on the determined similarity; and
    wherein displaying the linked hyper-video, within the hyper-video, is further based on the weighted error.

* * * * *